United States Patent

Hirate

[11] 3,961,144
[45] June 1, 1976

[54] EXCLUSION CIRCUIT IN KEY TELEPHONE SYSTEM

[75] Inventor: Masao Hirate, Tokyo, Japan

[73] Assignee: Nippon Electric Company Limited, Tokyo, Japan

[22] Filed: May 30, 1974

[21] Appl. No.: 474,648

[30] Foreign Application Priority Data
May 31, 1973  Japan.................................. 48-60230

[52] U.S. Cl................................ 179/99; 179/18 AD
[51] Int. Cl.²........................................... H04M 1/68
[58] Field of Search ............ 179/99, 37, 17 B, 18 F, 179/18 FA, 19, 20, 30, 31, 38–40

[56] References Cited
UNITED STATES PATENTS

| | | | |
|---|---|---|---|
| 2,785,229 | 3/1957 | Faulkner ............................ | 179/18 F |
| 3,299,217 | 1/1967 | Burns.................................... | 179/99 |
| 3,529,098 | 9/1970 | Chapman............................. | 179/19 |
| 3,699,265 | 10/1972 | Altenburger.................... | 179/18 FA |
| 3,725,601 | 4/1973 | Jetzt et al. ............................ | 179/99 |
| 3,860,763 | 1/1975 | Sudoh et al........................... | 179/99 |

*Primary Examiner*—Kathleen H. Claffy
*Assistant Examiner*—Gerald L. Brigance
*Attorney, Agent, or Firm*—Sughrue, Rothwell, Mion, Zinn & Macpeak

[57] ABSTRACT

In a telephone system of the type in which two or more sets may be keyed into the same line, an exclusion circuit is provided which prevents all other sets from accessing a given line once the line is accessed by any one set. The exclusion circuit eliminates a relatively expensive thyristor or SCR circuit and substitutes a simple flip-flop circuit. The flip-flop circuit controls a relay which in turn controls connection of the line contacts to the speech circuit. When a key is depressed to select a line and when the telephone is off-hook, voltage is supplied to the flip-flop. The latter circuit is structured so that it assumes a first stable state whereby the relay is energized and the speech network is disconnected from the line. The relay also throws a switch which connects the control line associated with the selected line circuit to a trigger input of the flip-flop. If the line has not been previously accessed by another set, the voltage on the control line triggers the flip-flop to a second stable state whereby the relay is reset or deenergized and the speech network is reconnected to the line. However, if the line circuit is already engaged by another set, the voltage on the control line will be substantially zero. This will be insufficient to trigger the flip-flop to the second stable state. Consequently, the relay remains energized and the speech network remains disconnected from the line.

2 Claims, 2 Drawing Figures

EXCLUSION CIRCUIT IN KEY TELEPHONE SYSTEM

BACKGROUND OF THE INVENTION

The present invention relates to an exclusion circuit employed in a key telephone system comprising a number of telephone sets, each accommodating a plurality of lines, and the exclusion circuit having functions including the function of originating and answering calls over the telephone lines, the function of selecting and holding a line, and the function of permitting intercommunications between telephone sets.

A key telephone system comprises a number of key telephone sets connected to each other, in a multiple form, by way of line buttons. In such system, speech between two telephone sets can readily be tapped by another telephone set when connected to the associated line. It has therefore been necessary to provide some means capable of preventing speech between two telephone sets from being tapped through the associated line of speech channel.

This privacy-protective function must be workable in such manner that a telephone set which is to initiate a call may be connected to the desired line only when such line is idle, and the line engaged thereby is held thereafter and accessed by another telephone set.

Generally, a semiconductor device with switching and holding characteristics, such as thyristor, is used in the prior art exclusion circuit of a key telephone set. This semiconductor device must be used with a protective circuit and a misoperation preventive circuit, with the result that the circuitry is inevitably complicated. Furthermore, the semiconductor device used is expensive.

SUMMARY OF THE INVENTION

Accordingly, it is an object of the present invention to provide a constructionally simple and inexpensive privacy circuit used in the key telephone set.

Briefly, the exclusion circuit of this invention has a relay circuit in combination with a flip-flop circuit comprising semiconductor devices. The relay has two pairs of contacts, one being connected in series to a control line and used to determine the transition of the state of the flip-flop circuit after one state is initiated, according to the value of current flowing in the control wire, and the other being used to control the establishment of termination of a speech network according to the state transition of the flip-flop circuit.

Thus, when a subscriber removes the handset from the switch hook and depresses a line button, thereby causing the state transition of the flip-flop and operating the relay, one pair of its contacts plays a part in determining whether to effect another state transition or to hold the existing state, according to the value of the current flowing in the control line, and the other pair is to establish or disconnect a speech network according to the flip-flop state transition.

The other objects, features and advantages of the invention will become apparent from the following description taken in conjunction with the accompanying drawings.

DETAILED DESCRIPTION OF THE PREFERRED EMBODIMENT

Figure 1:
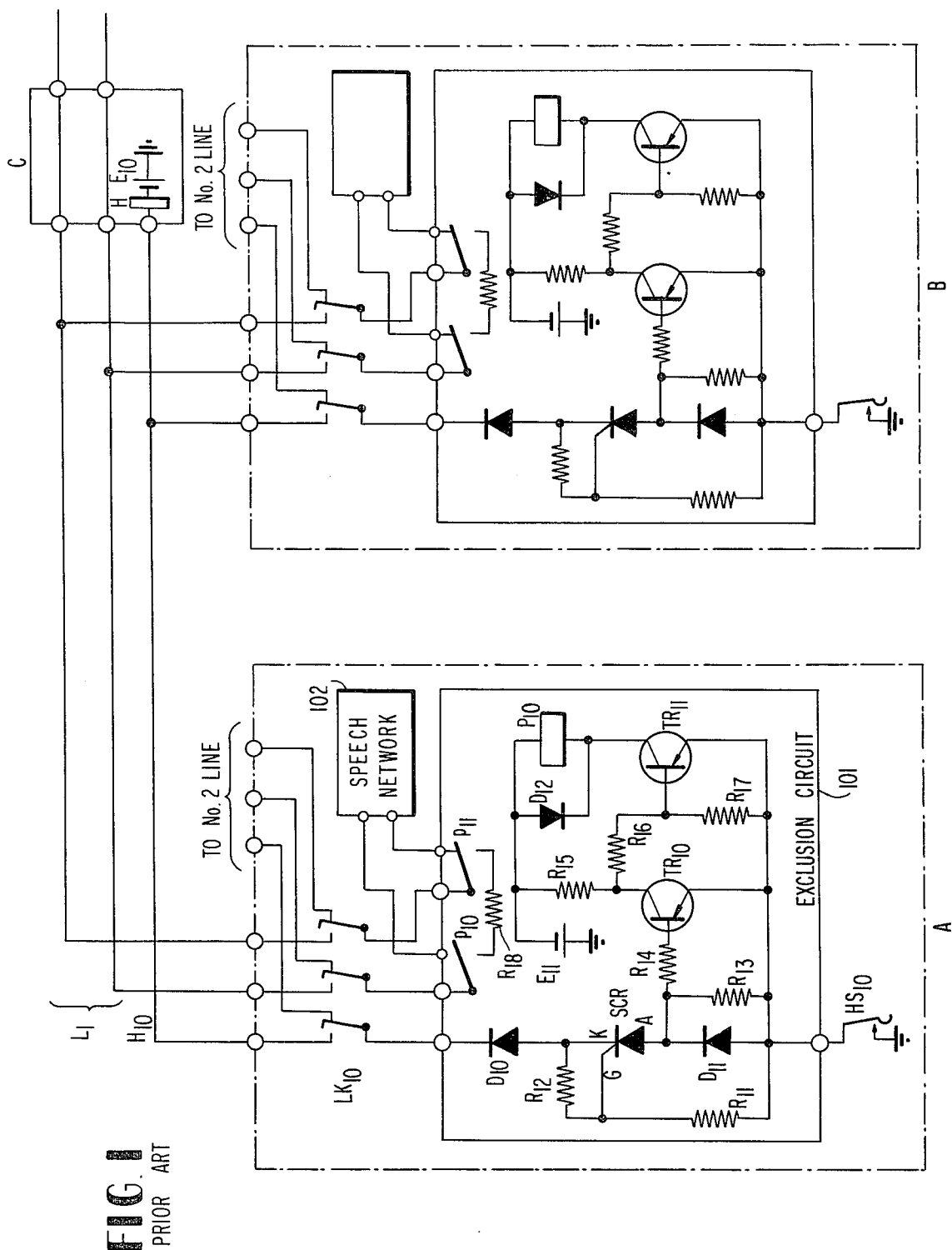
FIG. 1 is a block diagram showing an example of prior art exclusion circuit in a key telephone system.

Referring to FIG. 1, a block diagram is shown to illustrate a key telephone system with associated prior art exclusion circuit wherein, for simplicity, two key telephone sets (hereinafter briefly, telephone sets) are shown connected to a telephone circuit.

The telephone set A comprises an exclusion circuit 101, a speech network 102, a line button $LK_{10}$, and a hook switch $HS_{10}$. This telephone set is connected to the telephone circuit through a control unit C comprising a relay H which controls a line lamp for indicating the holding of a line. The other telephone set B is the same as the telephone set A in construction. Now assume that No. 1 line is idle and the attendant of telephone set A depresses line button $LK_{10}$, thereby selecting No. 1 line which comprises a line $L_1$ and a control wire $H_{10}$. Then, by lifting the handset (not shown), hook switch $HS_{10}$ is closed to allow current to flow through the following circuit: ground—hook switch $HS_{10}$—resistor $R_{11}$—resistor $R_{12}$—diode $D_{10}$—line switch $LK_{10}$—control wire $H_{10}$—battery $E_{10}$—ground. This current is shunted to the gate-cathode circuit of a thyristor SCR connected in parallel to resistor $R_{12}$, to cause this thyristor to be turned on. As a result, current flows through the following circuit: ground—hook switch $HS_{10}$—diode $D_{11}$—thyristor $SCR_{A-K}$—diode $D_{10}$—line switch $LK_{10}$—control wire $H_{10}$—battery $E_{10}$—ground. The voltage developed thereby across diode $D_{11}$, resistors $R_{13}$ and $R_{14}$ causes a base current to flow in transistor $TR_{10}$ whereby this transistor is turned on. Accordingly, the voltage drop between the emitter and collector of transistor $TR_{10}$ becomes small and hence transistor $TR_{11}$ does not become conductive. Under this condition, no current flows through relay $P_{10}$ and this relay is kept unenergized. Consequently, its contacts $P_{10}$ and $P_{11}$ remain connected to the side of speech network 102 to allow the attendant to converse. In the circuit shown, resistor $R_{15}$ serves as the bias resistor for transistor $TR_{10}$, and resistors $R_{16}$ and $R_{17}$ as the bias resistors for transistor $TR_{11}$.

Now assume that at the time the attendant at telephone set A selects No. 1 line, telephone set B has already accessed or engaged line $L_1$. Under this condition control wire $H_{10}$ is substantially at ground potential from the SCR circuit in telephone set B and, as a consequence, the potential across thyristor SCR in telephone set A is insufficient to cause this thyristor to conduct, and there is no base current in transistor $TR_{10}$ to cause this transistor to conduct. Therefore, current flows through the following circuit: ground—hook switch $HS_{10}$—the parallel circuit of resistor $R_{17}$ and emitter base of $TR_{11}$—resistor $R_{16}$—resistor $R_{15}$—battery $E_{11}$—ground. As a result, transistor $TR_{11}$ turns on. The conduction of transistor $TR_{11}$ causes current to flow through the following circuit: ground—hook switch $HS_{10}$—transistor $TR_{11(E-C)}$—relay $P_{10}$—battery $E_{11}$—ground. Accordingly, relay $P_{10}$ is operated and speech network 102 is disconnected from line $L_1$ through contacts $P_{10}$ and $P_{11}$. Thus, a speech channel established by telephone set B is prevented from being tapped by telephone set A. Contacts $p_{10}$ and $p_{11}$ of relay $P_{10}$ are of make-before-break type. Any abnormal voltage produced between lines when contacts $p_{10}$ and $p_{11}$ break is absorbed by resistor $R_{18}$, and an over-voltage developed across the coil of relay $P_{10}$ is suppressed by diode $D_{12}$.

Unfortunately, however, this conventional circuit must depend upon an intricate thyristor circuit, which accounts for a considerable portion of the cost of the whole circuit.

Figure 2:
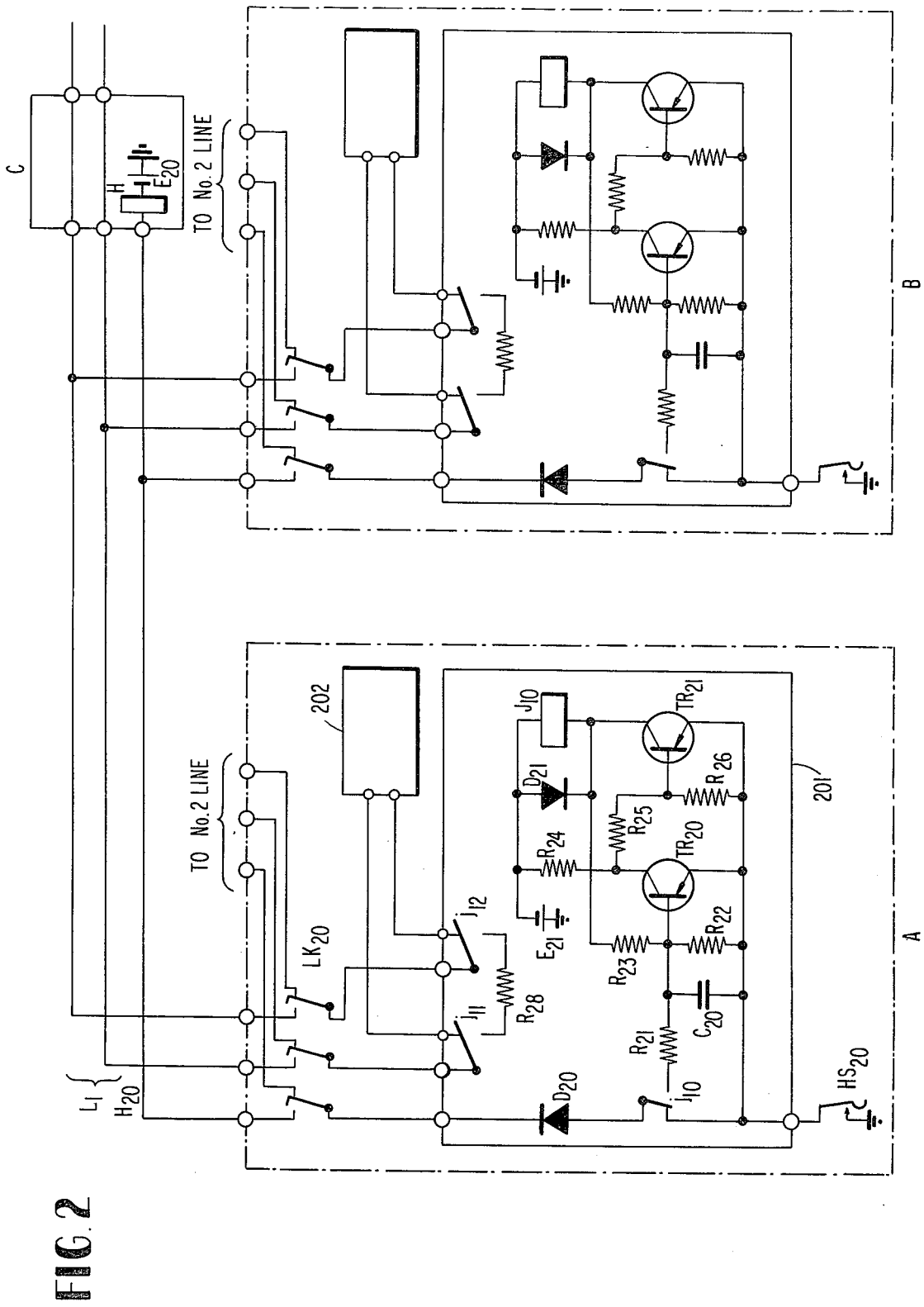
FIG. 2 is a block diagram showing an exclusion circuit of an embodiment of the invention.

With reference now to FIG. 2, an embodiment of the invention is illustrated by a circuit diagram wherein a flip-flop circuit is constituted of transistors $TR_{20}$ and $TR_{21}$. Transistor $TR_{21}$ has its collector connected to relay $J_{10}$ through which a speech network is established or disconnected from a line. Contact $j_{10}$ of relay $J_{10}$ is connected in series to control wire $H_{20}$ corresponding to speech line $L_1$ and used to change the states of transistors $TR_{20}$ and $TR_{21}$. Contacts $j_{11}$ and $j_{12}$ are inserted in speech network 202 whereby this network is controlled for operation in either speech state or privacy state. Capacitor $C_{20}$ is connected between the base and the emitter of transistor $TR_{20}$ whereby transistor $TR_{20}$ is operated with a delay after the operation of transistor $TR_{21}$. The purpose of resistor $R_{21}$ is to control the base current of transistor $TR_{20}$ when contact $j_{10}$ makes. Resistors $R_{22}$ and $R_{23}$, and resistors $R_{25}$ and $R_{26}$ are for feeding back the collector potentials of transistors $TR_{20}$ and $TR_{21}$, respectively.

Assume that No. 1 line is idle. Then, by depressing line button $LK_{20}$ and lifting the handset (not shown), hook switch $HS_{20}$ is closed whereby a ground potential is led to control line $H_{20}$ by way of a circuit: ground—hook switch $HS_{20}$—contact $j_{10}$—diode $D_{20}$—line button $K_{20}$. At the same time, a ground potential is supplied to the emitters of transistors $TR_{20}$ and $TR_{21}$. Transistor $TR_{21}$ becomes conducting and transistor $TR_{20}$ remains in off-state because capacitor $C_{20}$ is connected between the base and the emitter of transistor $TR_{20}$ to delay the operation of this transistor. Under this condition, the flip-flop circuit operates stably and relay $J_{10}$ connected to the collector of transistor $TR_{21}$ is actuated. As a result, its contact $j_{10}$ makes to allow current to flow in the base of the transistor $TR_{20}$. Therefore, transistor $TR_{20}$ is turned on, the conduction state of transistor $TR_{21}$ is inverted, and relay $J_{10}$ is instantaneously reset. Thus, a stable state is established where transistor $TR_{20}$ is in on-state, and transistor $TR_{21}$ is in off-state. In this state, a loop is formed by way of: ground—hook switch $HS_{20}$—contact $j_{10}$—diode $D_{20}$—line button $LK_{20}$—control wire $H_{20}$—battery $E_{20}$—ground. Because relay $J_{10}$ has been reset, a speech network to the line is set up through line button $LK_{20}$ and relay contacts $j_{11}$ and $j_{12}$ to enable the attendant of telephone set A to converse.

Now assume that No. 1 line is engaged by telephone set B. Under this condition, when line button $LK_{20}$ in set A is depressed to select line $L_1$, and the handset (not shown) is removed on the side of telephone set A, relay $J_{10}$ is operated to make its contact $j_{10}$, and contacts $j_{11}$ and $j_{12}$ are brought to the side of resistor $R_{28}$, as in the case where No. 1 line is idle. In this state, a ground potential is led to control wire $H_{20}$ from telephone set B and hence no base current flows in transistor $TR_{20}$ of telephone set A, and this transistor does not become conductive. Accordingly, transistor $TR_{20}$ remains in off-state, transistor $TR_{21}$ is on-state, and relay $J_{10}$ is in operation. Contacts $j_{11}$ and $j_{12}$ stay on the side of resistor $R_{28}$, and telephone set A is maintained in privacy state since speech network 202 is disconnected from line $L_1$. Under this condition, if No. 2 line is idle, a speech channel is established through the line of telephone set A, as in the operation described above, by depressing line button $LK_{20}$ to select No. 2 line.

This embodiment is an example where two telephone sets are connected to the line. The invention is not limited to this example, but applicable to a circuit comprising more than two telephone sets.

As has been specifically described above, the invention obviates the need for an intricate switching circuit formed of thyristors or the like, as well as for elements having holding characteristics, thus markedly simplifying the circuitry and permitting privacy circuits to be realized at low costs.

While there has been shown and described but one embodiment of the invention, it will be understood by those skilled in the art that numerous modifications and changes may be made without departing from the spirit and scope of the invention.

What is claimed is:

1. In a telephone set of the type having, an off-hook switch, and a key operated control for selecting a line circuit in common with other such telephone sets, said line circuit having a control wire corresponding thereto, the improvement being an exclusion circuit comprising:
   a. a bistable circuit comprising a pair of transistors having their input and output terminals cross-coupled to provide feedback for holding said bistable circuit in a stable state, and a capacitor connected across the input of a first of said transistors, said bistable circuit being connected via said off-hook switch to a source of power whereby said capacitor causes said bistable circuit to always assume upon initial application of power thereto a first stable state wherein said second transistor conducts and said first transistor is cut off,
   b. switch control means comprising a relay connected in the output circuit of said second transistor and responsive thereto for controlling first and second switches to cause said first and second switches to switch from their respective normal positions to their respective alternate positions when said bistable circuit is in said first stable state,
   c. said first switch means in its normal position being connected between said control wire and a reference potential via said off-hook switch, and in its alternate position being connected between said control wire and a trigger input to said bistable circuit, and
   d. said second switch means in its normal position being connected between said line circuit via said key operated control and a speech network for said set, and in its alternate position disconnecting said line circuit via said key operated control, whereby a non-reference potential on said control wire at the time of switching of said first switch causes said bistable circuit to assume its second stable state, and whereby a reference potential on said control wire at the time of switching of said first switch keeps said bistable circuit in its first stable state thereby to disconnect said speech network of the telephone set from said line circuit.

2. The telephone set as claimed in claim 1 wherein said first switch means has a fixed terminal and a movable terminal, said fixed terminal being connected via a diode and said key operated control to said control line, said movable terminal in the normal position of said switch being connected to one terminal of said off-hook switch, the other terminal of said off-hook switch being connected to a reference potential, said movable terminal in the alternate position of said switch being connected to the input of said first transistor.

* * * * *